United States Patent Office 3,694,226
Patented Sept. 26, 1972

3,694,226
QUICK-COOKING RICE PRODUCT AND PROCESS
FOR PREPARING SAME
Robert F. Howland, Dover, Joseph B. Haigh II, Milford, and Robert W. Fusi, Dover, Del., assignors to General Foods Corporation, White Plains, N.Y.
No Drawing. Filed June 11, 1968, Ser. No. 736,020
Int. Cl. A23l 1/10
U.S. Cl. 99—80 PS
5 Claims

ABSTRACT OF THE DISCLOSURE

A quick-cooking rice product is prepared by gelatinizing the rice in stages, controlling the increase in moisture content of the rice during each stage, and drying the rice under conditions whereby a desired bulk volume of the product is attained.

BACKGROUND OF THE INVENTION

This invention relates to a quick-cooking rice product and to a process for preparing the same. More particularly, this invention relates to a quick-cooking rice product which, upon rehydration, exhibits a soft, moist, gelatinous texture and is characterized by its absence of mealiness. Still more particularly, this invention relates to a quick-cooking rice product which, upon rehydration, has quality features sought after by both commodity rice and convenience rice consumers alike.

Processes for treating raw rice to render it quick-cooking are well known. One such process is set forth in U.S. 2,438,939 to Durrani, wherein the rice grains are cooked in water to increase the moisture content thereof to about 65–80% and to swell the grains substantially beyond their original size and are thereafter dried in such a manner as to set them in their enlarged condition. This product may be prepared for the table in as little as 10 minutes.

U.S. 2,696,156 and 2,696,157, both to Campbell et al., and U.S. 2,696,158 to Shuman et al. describe other processes for preparing quick-cooking rice. These patents disclose that raw rice is heated by convection, radiant, or dielectric means, respectively, to produce cracks and fissures throughout the grains. The fissures are believed to facilitate a subsequent cooking operation by allowing rapid penetration of moisture to the interior of the grains. Furthermore, these patents describe a process consisting of a combination of the heat treatment process and the process of the aforementioned Durrani patent, gelatinization of the fissured rice being achieved by either a steam-cooking or a water-cooking step. The rice is subsequently dried in its expanded state, as set forth in the Durrani patent mentioned above.

A process of fissuring the rice grains followed by either steam-cooking or water-cooking has been recognized as offering certain advantages. For example, the soaking time prior to gelatinization is decreased and may even be eliminated. Most importantly, however, the product obtained by the gelatinization of fissured rice in this manner requires less time to be prepared for serving, rehydration in some cases being as little as three to five minutes.

The method of U.S. 2,828,209 to Hollis et al. represented a distinct improvement in quick-cooking rice processes by providing for fissuring the rice grains followed by both water-cooking and steam-cooking.

An alternative preheating method is disclosed in U.S. 3,189,462 to Autrey et al. wherein thermal cycling followed by gelatinization is indicated.

U.S. 3,071,471 and 3,157,514 both to Gorozpe, teach processes for preparing quick-cooking rice products but in these patents as well, fissuring or preheating the rice to produce checks therein is a preferred procedure.

However, in all of the aforementioned processes and methods, fissuring or preheating or thermal cycling generally is seen to be a necessary step in preparing a quick-cooking rice product. Because of such step, the rehydrated rice is frequently characterized by its crumbliness, grittiness, and mealiness.

It is an object of this invention to provide a process for preparing a quick-cooking rice of good texture and rapid rehydration qualities without the aforementioned textural disadvantages. It is another object of this invention to provide a process for preparing a quick-cooking rice product by means of a procedure whereby fissuring or preheating and thermal cycling generally may be avoided. It is a still further object of this invention to provide a process for preparing a quick-cooking rice product having quality characteristics such as texture, appearance, and flavor sought after by commodity rice consumers and yet retaining the convenience characteristics long preferred by quick-cooking rice consumers. These and other objects and advantages will become apparent from the following description.

SUMMARY OF THE INVENTION

It has now been unexpectedly found that a quick-cooking rice product may be prepared without a "pretreatment" step by gelatinizing white milled rice in stages with the increase in moisture content of the rice during each stage being carefully controlled and then drying the rice under conditions whereby a product having a desired bulk volume is attained.

Thus, in contrast with certain prior art processes, "pretreatment" involving a preheating or fissuring step or thermal cycling procedure is not required in this process. Moreover, in distinction to other prior art processes, e.g., U.S. 2,720,460, "pretreatment" involving hydrating or soaking raw rice in water at temperatures below the gelatinization temperature of the starch contained in the rice, i.e., about 160° F. is avoided. We have discovered that even without "pretreatment" hydration accompanied by partial gelatinization of raw rice does allow subsequent processing and further gelatinization with considerable variations in such steps being possible.

DETAILED DESCRIPTION OF THE EMBODIMENTS

This invention provides a process by which raw white milled rice is cooked to a uniform palatable texture by gradual hydration and gelatinization in stages and then is dried such that, upon rehydration, the quick-cooking rice product will assume the desired appearance and table qualities of commodity rice. Thus, the quick-cooking rice product of this invention has the eating quality of commodity rice prepared by traditional household recipes and yet it is quick-cooking, that is, it is capable of being rehydrated either by adding the product to boiling water, removing from heat and letting stand for a period of about five minutes, or by simmering the product in water for a period of about three to five minutes.

Generally, the process of this invention involves the steps of:

(a) hydrating rice to raise its moisture content to about 30 to 50% to cause swelling of the rice and at least partial gelatinization thereof in a first stage, (b) further partially gelatinizing the hydrated rice in a second stage while increasing its moisture content to about 55 to 70%, (c) subsequently substantially completing the gelatinization of the further partially gelatinized rice in a third stage by exposing said rice to steam, (d) terminating the gelatinization by exposing the gelatinized rice to water, during which exposure its moisture content is increased to about 68 to 78%, (e) drying the gelatinized rice to reduce its moisture content to about 7 to 14%.

The process involves hydrating and first stage gelatinizing by immersing raw rice in water above its gelatinization temperature followed by further gelatinization comprising hot water immersions, steaming, hot water spraying and/or combinations thereof, employing two or more such stages to achieve the desired degree of cook for the product. The process is unique in that rice is brought to a fully cooked condition of exceptional uniformity from grain to grain and from the surface of the grain to its interior by control of the moisture content increase during each stage.

During each stage of gelatinization, water is absorbed and adsorbed by the rice grains with moisture contents generally in the order of 30 to 50% in the first stage, 55 to 70% in the second stage, and 68 to 78% following the third stage being obtained.

After the condition of a uniformly and fully gelatinized and cooked hydrated rice grain is achieved, specific drying techniques are practiced in order that the desired properties of commodity rice with quick-cooking features will be manifested in the later rehydrated product. The gelatinized and cooked rice is dried under conditions such that a product with a bulk volume of approximately 250–300 cc./100 g. is obtained. The drying is carried out in a series of drying zones, the temperature of said zones being maintained between about 200° F. to about 360° F., and exposing the rice to the higher temperature drying zones at the outset of the drying step. Such bulk volume permits uniform and rapid rehydration of the product whether using the aforementioned standing water or simmering water recipe.

The invention will now be further described by reference to the following examples:

Example I

Eighteen hundred pounds/hour of raw milled Blue Bonnet rice are immersed in an excess of water at 185° F. for 10 minutes in a reel type water blancher. During the hydrating step and first stage gelatinization, the moisture content of the rice is increased from 12 to 43%. The rice is then water flumed (in 95° F. water) to an immersion cooker where it is retained for 8 minutes in 208° F. water and is further gelatinized in this second stage with a moisture content of 65% being obtained. The rice is water flumed again (110° F. water) to an atmospheric steam blancher and it is drained of water prior to entering the steam chamber. Steam is continuously admitted to elevate and maintain the temperature of the rice bed therein at 200–212° F. for a period ranging from 10 to 25 minutes. In this example, the rice is subjected to atmospheric steam uniformly sprayed in the chambers into the rice from below the bed for a period of 16 minutes. As a result of this steam treatment, the rice will undergo a further partial cooking and third stage gelatinization.

The fully cooked rice after leaving the steam chamber then then washed from the belt with water (less than 90° F.), quenched and pumped onto a drain belt. The retention time in the pumping operation is about 15–18 seconds. During this time of immersion and agitation, the rice becomes dispersed discretely, and gelatinization is terminated, and additional moisture will be added to the grains through adsorption and absorption. The water is then drained from the rice, whose moisture content is now approximately 72%. The gelatinized rice having been drained of free water is then fed to the dryer apparatus hereinafter described.

Rice is fed into the first of four equal-length sections of a through-circulation continuous belt dryer at a bed depth of ¾ inch to 1 inch. Air admitted to the first section of the dryer is at a temperature of 355° F. and is circulated through the bed from the bottom upward, a portion of the air being exhausted and a portion being recirculated.

The rice is then fed continuously on the belt to the second dryer section wherein it is contacted with a forced draft of hot drying air at a temperature of about 345° F., directed upwardly onto the bed of product on the belt.

From the second dryer section, the rice is introduced to the third section wherein it is contacted with air circulating downwardly through the bed. The temperature of the air will be typically 300° F. in the third section. The rice is then admitted to the fourth section where the bed is contacted with air at a temperature of 290° F. circulating downwardly. The rice will be dehydrated to a terminal moisture content of 7–14%. In this example, the rice is dehydrated to a stable moisture content of 9% and the total drying time is 12 minutes. After drying, the rice will be introduced to suitable finger-breaking apparatus to separate any grains that may have adhered to each other and will be ready for packaging.

The dried rice is found to have a bulk volume of about 270 cc./100 grams.

Example II

The procedure of Example I is generally followed employing slightly varied processing conditions as expressly indicated herein.

Arkansas Blue Bonnet rice is immersed in water at 190° F. for 3–10 minutes or until a moisture content of 42% is achieved. This rice is then drained of free water and introduced to a steamer. Steam and hot water spray (170° F.) are continuously applied to the rice bed for a period ranging from 10–20 minutes to envelop the rice, and to elevate and maintain the temperature of rice grains at 200–212° F. As a result of this steam and hot water treatment, the rice will pick up approximately 25% moisture.

The partially cooked rice is then introduced to a second steamer where it is cooked further. The rice is maintained in this steamer for a period of 10–20 minutes. As a result, the rice grains will be further gelatinized, and after fluming in 70° F. water the rice is then drained of free water and admitted at a moisture content of 70% to a dryer with drying sections or zones having temperatures generally in the ranges indicated in Example I.

After drying, the rice is introduced to suitable finger-breaking apparatus and is then packaged. The bulk volume of the rice prepared by this alternative embodiment is 260 cc./100 g.

The rice can be prepared for eating by many recipes. The rice can be added to boiling water, whereupon it is removed from heat and allowed to stand for 5 minutes, preferably in a covered pot. Thus, a typical procedure following this recipe for rehydrating the product to a palatable cooked rice having desirable eating qualities is as follows: Bring 1½ cups of water to a boil, add 1½ cups of rice, stir, cover, remove from heat and let stand 5 minutes to obtain 2⅔ cups of rehydrated product. Alternatively, the rice can be immersed in gently boiling water and allowed to simmer for 3–5 minutes in an open or covered pot.

The cooked rice product prepared by the consumer after rehydration is of a slightly soft, moist, gelatinous texture and the texture is similar to that of commodity rice and is deemed by many to be preferable to conventional quick-cooking rice. The cooked rice product has superior appearance and eating qualities and each kernel is uniformly cooked throughout with no starchy or mealy taste or texture.

Thus, the invention is seen to involve hydrating and gelatinizing rice in stages by a plurality of water-cooking and/or steam-cooking operations, each of which may be interrupted by an immersion in water at a temperature less than about 110° F., usually 80–110° F. The rice starch undergoes degrees of gelatinization to bring about controlled moisture content increases prior to drying in a series of zones.

Such water-cooking and/or steam-cooking follows an initial hydrating step wherein partial gelatinization takes place and is repeated for a sufficient number of cycles to cause the rice to be hydrated to at least about 60% moisture, and preferable in the neighborhood of between about 68–78%. The latter moisture content is achieved by terminating the gelatinization by exposing the gelatinized rice to water prior to drying.

The cooked rice is introduced to drying zones wherein it is carried down in moisture content from a level of 68–78% to a level less than 14% and in the order of 7–14%. The bulk volume of the quick-cooking rice ranges from 250–300 cc./100 g. In general, the drying rate in the zones should be controlled by controlling the wet and dry bulk temperatures of the inlet drying air and those of the exhaust air from the drying zone, as well as the bed loading and velocity of inlet drying air to achieve the desired bulk volume. The preferred dry bulk temperature range of the inlet drying air during initial dehydration will typically range between about 270° F. and 360° F. although lower inlet temperatures may be practiced, provided other drying variables, e.g., humidity, velocity, bed depth, are adjusted to achieve the desired rate of drying, with the rice entering the higher temperature zones at the outset.

While the present invention has been described with particular reference to specific examples, it is not to be limited thereby, but reference is to be had to the appended claims for a definition of its scope.

We claim:
1. A process for preparing a quick-cooking rice product having a bulk volume of 250–300 cc./100 g. and which, on rehydration, exhibits a soft, moist, gelatinous texture and is characterized by an absence of mealiness which comprises the steps of:
   (a) hydrating raw white milled rice to raise its moisture content to about 30 to 50% to cause swelling of the rice and at least partial gelatinization thereof in a first stage,
   (b) further partially gelatinizing the hydrated rice in a second stage while increasing its moisture content to about 55 to 70%,
   (c) subsequently substantially completing the gelatinization of the further partially gelatinized rice in a third stage by exposing said rice to steam,
   (d) terminating the gelatinization by exposing the gelatinized rice to water, during which exposure its moisture content is increased to about 68 to 78%,
   (e) drying the gelatinized rice to reduce its moisture content to about 7 to 14%, said drying being carried out in a series of drying zones, the temperature of said zones being maintained between about 200° F. to about 360° F., and exposing the rice to the higher temperature drying zones at the outset of the drying step.

2. A process as in claim 1 in which the hydrating is carried out by immersing the rice in water having a temperature of 160° to 190° F. for a period of 3 to 15 minutes.

3. A process as in claim 2 in which the subsequent gelatinizing in the third stage is carried out by exposing the further partially gelatinized rice to approximately atmospheric pressure steam for a period of about 10 to 20 minutes.

4. A process as in claim 3 in which the partial gelatinizing in the second stage is carried out by water-cooking the hydrated rice for a period of about 5 to 15 minutes in water temperatures of 200° to 212° F.

5. A process as in claim 3 in which the partial gelatinizing in the second stage is carried out by exposing the hydrated rice to contact with steam and hot water, said contact being established by steaming and hot water spraying of said rice for a period of about 10 to 20 minutes.

References Cited
UNITED STATES PATENTS

| | | | |
|---|---|---|---|
| 2,438,939 | 4/1948 | Ozai Durrani | 99—80 |
| 2,720,460 | 10/1955 | Flynn et al. | 99—80 |
| 3,086,867 | 4/1963 | Miller | 99—80 |
| 3,157,514 | 11/1964 | Gorozpe | 99—80 |
| 3,408,202 | 10/1968 | Serbia et al. | 99—80 |

RAYMOND N. JONES, Primary Examiner